United States Patent Office 3,432,255
Patented Mar. 11, 1969

3,432,255
HYDROCHLORINATION PROCESS FOR RECOVERY OF METAL VALUES
Ray S. Long, Concord, and Elmer C. Tveter, Walnut Creek, Calif., assignors to The Dow Chemical Company, Midland, Mich., a corporation of Delaware
No Drawing. Continuation-in-part of application Ser. No. 237,739, Nov. 14, 1962. This application Feb. 3, 1966, Ser. No. 524,823
U.S. Cl. 23—16                               6 Claims
Int. Cl. C01g 1/06, 39/00, 29/00

ABSTRACT OF THE DISCLOSURE

The present invention relates to a novel hydrochlorination process for winning molybdenum, tin, antimony, bismuth and like metal values from their ores and minerals. In the present process, a metal value containing source material, containing one or more of molybdenum, tin, antimony, bismuth and the like metal values, the chloride compounds of which readily are volatizable, is contacted with hydrogen chloride and an oxidizing gas at a temperature sufficiently high that the metal values are converted to volatile chloride compounds and removed from the reaction zone while simultaneously assuring that impurity metal values remain as a solid residue of oxides which are substantially non-volatile under the process temperatures.

---

This application is a continuation-in-part of application Ser. No. 237,739, filed Nov. 14, 1962 and now abandoned.

This invention relates to ore processing and more particularly is concerned with a novel hydrochlorination process for winning certain metal values from their ores and minerals.

Although large reserves of ores containing molybdenum, tin, antimony, bismuth and the like metal values are both commercially and technically important to the metals industry are known, in many instances these ores are in a form such that they do not lend themselves to ready recovery of the metal values therefrom in high purity by conventional ore treating processes. This can be illustrated in the winning of molybdenum values from oxidized molybdenum-containing ores contaminated with iron.

Oxidized molybdenum-containing minerals frequently are found together with molybdenite ($MoS_2$), the mineral presently used for major commercial molybdenum production. However, although these oxidized minerals provide a potential large source of molybdenum, the molybdenum cannot be concentrated in or separated from such oxidized minerals by the low-cost froth flotation technique which works very efficiently on molybdenite and other molybdenum sulfides.

Several concentration processes, e.g. special flotation techniques, magnetic separation and leaching procedures, have been proposed heretofore for these oxidized ores but none have been economically successful. Additionally, attempts have been made to upgrade molybdenum concentrates by the use of chlorination techniques whereby impurities are removed as soluble chlorides (British Patent 859,263). British Patent 374,250 reports the use of chlorine in the presence of a reducing agent to recover molybdenum from $MoS_2$ (molybdenite) ores, but this process allegedly results in excessive chlorine consumption by iron and other gangue minerals, lower recoveries of metal values and as indicated hereinbefore is not applicable with certain oxide ores.

It is a principal object of the present invention to provide a process for recovering metal values in high yields from ores and minerals wherein the recovered metal products as produced are of high purity.

It is another object of the present invention to provide a novel hydrochlorination process for winning metals from oxidized ores by which process the resulting chloride containing metal product is readily separated from the reaction mass.

It is an additional object of the present invention to provide a novel hydrochlorination metal winning process having low losses of chloride values which also provides for ready recycle of the chlorinating reactant.

It is a further object of the present invention to provide a novel metal winning process that is carried out at relatively low temperatures.

It is still another object of the present invention to provide a novel process for recovering metal values from ores which are not suitable for treatment by traditional flotation concentration techniques.

A further object of the present invention is to provide a novel process for treating ores and concentrates to separate molybdenum, tin, antimony or bismuth values from iron, tungsten or lead impurities contained therein.

A particular object of the instant invention is to provide an economical, successful novel process for the production of essentially iron-free molybdenum values from iron-containing molybdenum ores and concentrates.

These and other objects and advantages readily will become apparent from the detailed description presented hereinafter.

In the present process, a metal value containing source material; e.g. an ore or mineral containing one or more of molybdenum, tin, antimony, bismuth and the like metal values the chloride compounds of which readily are volatilizable, is contacted with hydrogen chloride and an oxidizing gas, e.g. air or oxygen, at a temperature sufficiently high that the metal values are converted to volatile chloride compounds and removed from the reaction zone while simultaneously assuring that impurity metal values such as iron, tungsten, calcium, magnesium and lead, for example, remain as a solid residue of oxides which are substantially non-volatile under the process temperatures. The volatile metal chlorides ordinarily are recovered by condensation after separation from the reaction mass.

More particularly in the instant process an ore containing metal values having volatile chlorides is contacted with hydrogen chloride and oxygen or air, either sequentially or as a hydrogen chloride-oxygen mixture or hydrogen chloride-air mixture at a temperature of from about 400° to about 800° C., preferably at from about 500° to about 700° C. for a period of time sufficient to prepare volatile chlorides of the metal values. The volatile metal value chlorides are removed from the reaction mass. These are recovered, ordinarily by condensation, at a temperature below their sublimation point.

The recovered metal chlorides can be used as produced. Alternatively, if desired, these compounds can be converted to the corresponding oxides with subsequent recovery of regenerated hydrogen chloride. This latter material can be recycled for reaction with additional ore.

The amount of hydrogen chloride to be employed is not critical except that the minimum total chloride value must be sufficient to provide for the desired degree of conversion of the metal values in the ore or mineral source which form volatile oxychlorides.

The amount of oxygen or air to be used at a minimum should assure complete reaction with and oxidation of impurity metal values to non-volatile oxide forms. The maximum quantity of oxidizing gas is not critical except that when mixtures of this material with hydrogen chloride are used the mixtures should not be excessively dilute with respect to the hydrogen chloride. Generally, with the mixtures a hydrogen chloride/air or oxygen volume proportion of from about 1/1 to about 1/6 is used.

Ordinarily, the ore particles are contacted with a mixture of hydrogen chloride and oxygen or hydrogen chloride and air. However, use of the mixtures is not essential unless one or more of the impurity metals tends to form a volatile chloride compound in the absence of oxygen or water at the temperature and hydrogen chloride concentration required to convert the metal values to volatile chloride compounds. For example, if iron is present only in the ferrous state and as the sole important impurity, the treatment with hydrogen chloride can precede the treatment with air. Although this will result in an initial chloride retention by the iron through formation of ferrous chloride, this is only temporary and the chloride is recovered during the subsequent oxidation step, either as chloride or, if moisture is present as hydrogen chloride. Similarly, if ferric iron is present treatment of the reaction mass with hydrogen chloride in the absence of water or air will produce ferric chloride which tends to evolve along with the product. This undesirable evolution can be suppressed, however, by using moist hydrogen chloride since ferric chloride readily is converted by water to hydrogen chloride and ferric oxide at temperatures above about 400° C. Thus, some ores first can be contacted with oxygen and then with moist hydrogen chloride, particularly in a batch type operation. For continuous operation, the greater simplicity and economy of co-treatment with hydrogen chloride and air is highly preferable.

It does not matter whether the hydrogen chloride required for volatilization of the metal value chloride compounds is supplied to the ore body as such or is generated in situ by, for example, the hydrolysis of a metal halide such as ferric chloride.

The particulation of the ore for use in the present process is not critical as both finely divided, e.g. 100–200 mesh or finer U.S. sieve series, materials and relatively coarse screenings (e.g. up to 0.125 inch or larger in diameter) are opened by the instant process.

This process is particularly suitable for recovering molybdenum values from oxidized molybdenum ores or mixed molybdenum oxide-sulfide ores which cannot be concentrated or treated by traditional froth flotation techniques or other conventional methods.

With these molybdenum ores, the ore is contacted with hydrogen chloride and oxygen or air, sequentially or as hydogen chloride-air or hydrogen chloride- oxygen mixtures, at a temperature of from about 400° to about 800° C., preferably from about 500° to about 700° C., for a period of from about 5 minutes to about an hour or more and preferably from about 7 minutes to about 30 minutes. Ordinarily the hydrogen chloride/molybdenum weight proportions, expressed as Cl/Mo, based on the total molybdenum concentration in the ore mass employed ranges from about 0.75 to about 5 pounds chloride/pound of molybdenum. The volatile product molybdenum chloride compounds are removed from the reaction mass and recovered by condensing these at a temperature below their sublimation point, usually at from about 100 to about 150° C. and preferably at from about 110 to about 120° C.

At reaction temperatures greater than about 400° C. in the presence of air, the reaction of HCl with iron oxide—a common contaminant in molybdenum-containing ores—to form the related ferric chloride is thermodynamically not favored while the formation of molybdenum oxychlorides and their volatilization from the reaction mass is highly favored. At these temperatures, therefore, not only is the reaction of HCl with molybdenum oxide-sulfide mixed ores promoted but also excessive loss of chlorine values to gangue materials, such as iron, is substantially completely eliminated.

If the condenser tube for product recovery is cooled to a temperature below about 100° C., the molybdenum oxychlorides condense as a relatively compact cake because of the presence of co-condensed water. This cake clings tenaciously to the wall of the condesner and is somewhat difficult to remove therefrom. However, by maintaining the temperature of the condenser between about 100 and 150° C., and, preferably from about 110 to about 120° C., the molybdenum oxychloride condenses as a loose, powdery solid material that readily is removed from the condenser and separated from the exit gas stream.

With oxidic molybdenum ores, for example, such as molybdite, ferromolybdate and powellite as well as more variable minerals such as parosites and iron oxides containing small amounts of molybdenum within their mineral structure, both the molybdenum content of the ore and the chloride content of the hydrogen chloride reagent are recovered in the product to a high degree and the chloride readily is converted to hydrogen chloride for re-use. With sulfide-containing ores, high recoveries of the molybdenum can still be obtained if operating temperatures sufficiently high (i.e., above about 500°) are employed. However, chloride compounds of sulfur are co-produced and these result in some chloride losses. Consequently, it is preferable to pre-roast sulfide-containing ores with air alone before introducing the hydrogen chloride. In general, a roasting period of about one hour or more at a temperature of about 500–700° is sufficient.

The instant process can be carried out in batch, cyclic or continuous operations. Conveniently an integrated batch-type operation is used wherein the gaseous reactant hydrochlorination agent is passed through a heated bed or column of the oxidized ore. The exit gases then can be cooled to separate the molybdenum oxychloride products therefrom.

Reactors, transfer lines, product receivers and the like are to be of materials and of a design so as to be structurally sound at the reaction temperature and not detrimentally attacked by the reactants and/or products.

The following examples will serve further to illustrate the present invention but are not meant to limit it thereto.

EXAMPLE 1

A mixed oxide-sulfide molybdenum ore was crushed to pass through a No. 8 mesh U.S. Standard Sieve. About 40 grams of the ore was placed into a vertical glass reactor tube having an inside diameter of about 1 inch and about 12 inches long. The tube and contents were heated to about 500° C. by means of an electric resistance coil. A mixture of hydrogen chloride and air (1:1.5 HCl/air) at a flow rate of about .033 gram/minute was passed up through the tube for a period of about thirty minutes during which period the reactor tube was continuously vibrated so as to prevent channeling of the gas flow through the reactor. This provided an equivalent Cl/Mo weight proportion of 0.4 gm. Cl/0.12 gm. Mo or 3.3/1.

The exit gases from the top of the reactor were passed into an air cooled tube whereupon the volatilized molybdenum oxychloride products condensed at a temperature of about 110° C. The results of this run are summarized in Table I which follows.

TABLE I

|  | Ore content | | Percent molybdenum volatilized |
| --- | --- | --- | --- |
|  | Original | Percent residue |  |
| Molybdenum oxide | 0.386 | 0.057 | 85 |
| Molybdenum sulfide | 0.111 | 0.017 | 84 |

EXAMPLE 2

A number of runs were made using a sample of a high iron magnetic molybdenum concentrate containing 0.895 percent molybdenum, as oxide, and 0.016 percent molybdenum as sulfide. For these runs, the same general procedure and apparatus as described in Example 1 was employed.

In each study, about 50 grams of the concentrate was heated to a predetermined temperature and reacted with approximately 2.1 grams of anhydrous hydrogen chloride (equivalent to about 5 lb. Cl/1 lb. Mo) over a 30 minute reaction period. Following this step, the system was maintained at the predetermined temperature for a period of from about 10 to about 20 minutes while passing moist air through the ore bed to purge excess reagents and effect substantially complete separation of the molybdenum chlorides from residual iron oxides. Table II presents the results obtained at a number of predetermined temperatures.

TABLE II

| Run No. | Temp., °C. | Ore heads, Percent Mo | Residue Percent Mo | Residue Percent Cl | Extraction, Percent Mo | Product color |
|---|---|---|---|---|---|---|
| Control | 230 | .91 | .895 | 1.78 | 1 | Orange. |
| 1 | 400 | .91 | .39 | .72 | 56 | Light yellow. |
| 2 | 600 | .91 | .263 | .10 | 70 | Colorless. |

At temperatures below about 400° C., considerable $FeCl_3$ was volatilized with the molybdenum oxychlorides as determined by visual observation and the color of the condensed product. However, in the presence of the air this quantity decreased with increasing temperature until at 600° C. essentially no iron was noted in the condensed product, despite the high iron content of the feed. These results also show the effect of increasing temperature on molybdenum recovery as well as on chloride loss in the non-volatile residue. This loss primarily is attributed to consumption of hydrogen chloride in the formation of ferrous chloride.

EXAMPLE 3

The reactor and procedure described for Example 1 was used with a low grade molybdenum ore contaminated with considerable amounts of iron. This ore upon analysis was found to contain 0.368 percent molybdenum (as oxide), 0.117 percent molybdenum (as sulfide), 2.0 percent iron and 1.0 percent sulfur.

About 100 grams of the ore was placed in the reactor and heated to 600° C. after which time a 1/1 volume mixture of air and hydrogen chloride was introduced into the reactor for a period of about 15 minutes while maintaining the temperature. This provided for a total hydrogen chloride gas flow of 1.2 grams (equivalent to about 2.5 lb. Cl/1 lb. Mo). The volatile product was condensed in a tube maintained at a temperature of from about 110 to 120° C. This product, as formed, was a loose powdery solid which readily was removed from the condenser tube.

Analysis of the residue in the reactor and the condensed volatilized product are summarized as follows.

Residue: Percent
- Mo (as oxide) _____ 0.072
- Mo (as sulfide) _____ 0.010
- Cl _____ 0.018
- S _____ 0.31

Volatilized product: Percent
- Al _____ 0.007
- Bi _____ 0.2
- Cu _____ 0.003
- Fe _____ <0.02
- Pb _____ <0.005
- Si _____ 0.06

The product, which contained 83% of the molybdenum in the ore, contained less than 0.3% total impurities.

EXAMPLE 4

One gram of $MoO_3$ was mixed with 2 grams of about 1:1 $Fe_2O_3$–$Fe_3O_4$ and 200 grams of silica sand and the resulting mixture placed on a porous support in the reactor tube described in Example 1. The mixture was heated to about 450° and air which had been bubbled through 12 N aqueous HCl was introduced into the reactor tube through the bottom. Almost immediately white molybdenum oxychloride was evolved from the reaction mass. Volatilization was complete after 15 minutes of contact with the air:wet hydrogen chloride mixture at the reaction temperature. The condensed product was substantially free from iron.

EXAMPLE 5

In the manner of Example 1, a quantity of low-grade antimony ore containing 2.88% Sb and 0.76% Fe after crushing to —28 mesh and contacting with air and hydrogen chloride at 450° C. for 10 minutes using a 1/1 HCl/air volume ratio and a chloride concentration sufficient to react with the antimony values effected a 94.5% recovery of the antimony as volatile oxychloride essentially free of iron contamination.

EXAMPLE 6

In the manner of Example 1, a mixed pre-roasted oxide-sulfide ore of molybdenum containing 0.10% vanadium-sulfides and 0.32% lead sulfides can be contacted at 550° with a hydrogen chloride-air mixture (1/1 HCl/air volume proportions) for about 30 minutes and a volatile molybdenum oxychloride product taken off. The product is free of vanadium but includes about 1.5% of lead. The process can be repeated, using the lead containing product as the starting material, and a final molybdenum oxide product containing less than 0.003% Pb can be obtained in good yield, based on the molybdenum content of the original ore.

EXAMPLE 7

In the manner of Example 1, efficient separation of a number of metal value containing mixtures is achieved by treatment of corresponding ores or minerals with hydrogen chloride and air or hydrogen chloride and oxygen in HCl/air or oxygen volume proportions of from 1/1 to 1/6 using HCl/volatile metal proportions sufficient to provide volatile chlorides of these metals at temperatures between 400° and 800° C. These include, for example:

| Overhead products consisting of volatile chloride compounds— | Non-volatile oxides present in residues |
|---|---|
| (a) Bismuth | Iron and lead. |
| (b) Tin | Iron. |
| (c) Tin | Iron, lead and vanadium. |
| (d) Antimony and molybdenum | Lead and vanadium. |
| (e) Tin and molybdenum | Lead. |
| (f) Tin and antimony | Iron. |

Various modifications can be made in the present process without departing from the spirit or scope thereof for it is understood that we limit ourselves only as defined in the appended claims.

We claim:

1. A process for recovering metal values from oxidized ore and mineral source materials which comprises:
   (a) providing a metal value containing source material containing at least one member selected from the group consisting of molybdenum, tin, antimony and bismuth, and also containing oxide forming oxidizable impurities,
   (b) contacting a particulated form of said metal value containing source material at a temperature of from about 400 to about 800° C. with hydrogen chloride and an oxidizing gas selected from the group consisting of air and oxygen at a hydrogen chloride/metal value proportion at least sufficient to provide volatile chlorides of said metal values, and at an oxidizing gas/hydrogen chloride proportion at least sufficient to assure complete and selective oxidation of impurity metal values to non-volatile oxide forms, (c) removing the resulting volatile metal chloride compounds from the reaction mass while maintaining the temperature within the range of from about 400 to about 800° C., and (d) recovering said volatile metal chlorides.

2. The process as defined in claim 1 wherein the metal value containing source material is a molybdenum ore, and, including the steps of contacting said ore for a period of from about 5 minutes to about 1 hour at a temperature of from about 400 to about 800° C. with hydrogen chloride and a member selected from the group consisting of oxygen or air at a hydrogen chloride/molybdenum proportion, expressed as Cl/Mo, of from about 0.75 to about 5 pounds Cl/1 pound of Mo, separating the resulting volatile molybdenum chloride compounds from the residual reaction mass and condensing the volatile molybdenum chloride compounds at a temperature of from about 100 to about 150° C.

3. The process as defined in claim 2 wherein the reaction between the hydrogen chloride and molybdenum ore is caried out at a temperature between about 500 to about 700° C. for a period of from about 7 to about 30 minutes and the separated volatile molybdenum chloride compounds are recovered by condensing these at a temperature of from about 110 to about 120° C.

4. The process as defined in claim 2 wherein the hydrogen chloride and oxidizing gas are employed as a mixture having a hydrogen chloride/oxidizing gas volume proportion ranging from about 1/1 to about 1/6.

5. The process as defined in claim 1 and including the step of converting the recovered volatile metal chloride compound products to the corresponding oxide and recovering regenerated hydrogen chloride.

6. The process as defined in claim 1 wherein the oxide forming oxidizable impurities are selected from the group consisting of iron, vanadium, tungsten, aluminum, magnesium, zinc, copper, calcium, lead and silicon.

References Cited

UNITED STATES PATENTS

| | | | |
|---|---|---|---|
| 1,329,380 | 2/1920 | Doerner | 23—17 |
| 1,481,697 | 1/1924 | Dyson et al. | 23—17 |
| 1,911,505 | 5/1933 | Herold et al. | 23—17 |
| 1,979,280 | 11/1934 | Mitchell | 23—87 |
| 2,330,114 | 9/1943 | Jahn | 23—219 |

EARL C. THOMAS, *Primary Examiner.*

H. T. CARTER, *Assistant Examiner.*

U.S. Cl. X.R.

23—87, 98, 140